United States Patent
Leins (10) Patent No.: US 10,047,842 B2
(45) Date of Patent: Aug. 14, 2018

(54) DEVICE FOR CARRYING OUT A LINEAR DISPLACEMENT OF TWO SHAFTS POSITIONED PARALLEL TO EACH OTHER

(71) Applicant: Blickle Sondermaschinen GmbH & Co. KG, Neufra (DE)

(72) Inventor: Reiner Leins, Albstadt (DE)

(73) Assignee: Blickle Sondermaschinen GmbH & Co. KG, Neufra (DE)

( * ) Notice: Subject to any disclaimer, the term of this patent is extended or adjusted under 35 U.S.C. 154(b) by 257 days.

(21) Appl. No.: 15/080,547

(22) Filed: Mar. 24, 2016

(65) Prior Publication Data
US 2016/0281829 A1     Sep. 29, 2016

(30) Foreign Application Priority Data

Mar. 27, 2015   (DE) .................. 10 2015 104 712

(51) Int. Cl.
| | |
|---|---|
| *F16H 25/18* | (2006.01) |
| *F16H 37/12* | (2006.01) |
| *B41F 13/008* | (2006.01) |
| *F16H 1/06* | (2006.01) |

(52) U.S. Cl.
CPC ......... *F16H 37/126* (2013.01); *B41F 13/008* (2013.01); *F16H 1/06* (2013.01)

(58) Field of Classification Search
CPC ......... F16H 37/126; F16H 1/06; B41F 13/008
See application file for complete search history.

(56) References Cited

U.S. PATENT DOCUMENTS

| | | | | |
|---|---|---|---|---|
| 2,597,861 A | * | 5/1952 | Gerlach ................. | E05F 11/44 49/351 |
| 2,652,862 A | * | 9/1953 | Henry ..................... | B27B 5/201 408/236 |
| 2,823,502 A | * | 2/1958 | Rambold ................ | B65B 29/02 206/0.5 |
| 3,426,994 A | * | 2/1969 | Daniel, Jr. .............. | E05D 15/14 248/277.1 |
| 3,617,670 A | * | 11/1971 | Linderfelt .............. | H01H 13/20 200/302.2 |

(Continued)

*Primary Examiner* — Zakaria Elahmadi
(74) *Attorney, Agent, or Firm* — Bachman & LaPointe, P.C.

(57) ABSTRACT

A device (100) for carrying out a linear displacement of two shafts (110, 120) positioned parallel to each other and each of which is at least indirectly connected to a main cogwheel (111, 121), while the two main cogwheels (111, 121) are mounted for reciprocatory displacement along a straight guide rail 130. The device has phase locking of the two main cogwheels (111, 121) independently of any continuous adjustment to the distance therebetween. The bearing forming the fulcrum of a first main cogwheel (111) determining the velocity of rotation and phase of rotation is in the form of a first vertex (A) of a parallelogram construction (A, B, C, D) formed by the arms (150, 160, 151, 140) pivoted in the region of all vertices (A, B, C, D). On a driving cogwheel 122 disposed opposite to the first vertex (A) there is disposed a third vertex (C) which is driven via an auxiliary cogwheel 122 which is disposed at a second vertex (B) of the parallelogram construction (A, B, C, D) and which in turn drives a second main cogwheel 121) at the same speed as, and in phase with, the first main cogwheel (111).

14 Claims, 5 Drawing Sheets

(56) References Cited

U.S. PATENT DOCUMENTS

| | | | | |
|---|---|---|---|---|
| 4,180,962 A * | 1/1980 | Michels | B65B 11/12 | 53/203 |
| 4,194,614 A * | 3/1980 | Hrivnak | B65G 47/82 | 198/468.1 |
| 4,205,501 A * | 6/1980 | Michels | B65B 11/12 | 53/228 |
| 4,228,884 A * | 10/1980 | Michels | B65B 57/005 | 192/135 |
| 4,635,493 A * | 1/1987 | Buckley | B22D 17/2007 | 414/917 |
| 4,728,041 A * | 3/1988 | Draxler | B05L 33/16 | 239/263 |
| 4,872,358 A * | 10/1989 | Buis | F16H 25/18 | 74/107 |
| 5,031,892 A * | 7/1991 | Stieger | B21D 43/24 | 271/10.01 |
| 5,065,637 A * | 11/1991 | Soltermann | D01G 15/28 | 19/106 R |
| 5,102,153 A * | 4/1992 | Rhode | A63C 5/00 | 180/185 |
| 5,150,627 A * | 9/1992 | Lindsay | F16M 11/10 | 248/179.1 |
| 6,209,405 B1 * | 4/2001 | Milsem | A47B 46/00 | 108/138 |
| 6,910,702 B1 * | 6/2005 | Hals | B62K 21/20 | 280/283 |
| 2004/0213651 A1 * | 10/2004 | Malin | B65G 1/045 | 414/331.05 |
| 2011/0166674 A1 * | 7/2011 | Montmartin | A61F 2/6607 | 623/47 |
| 2014/0020507 A1 * | 1/2014 | Sasaki | B25J 9/106 | 74/99 R |
| 2014/0246539 A1 * | 9/2014 | Didey | B64C 25/405 | 244/50 |
| 2016/0201776 A1 * | 7/2016 | Takase | F16H 25/2204 | 74/89.23 |

* cited by examiner

DEVICE FOR CARRYING OUT A LINEAR DISPLACEMENT OF TWO SHAFTS POSITIONED PARALLEL TO EACH OTHER

CROSS-REFERENCE TO RELATED APPLICATION

Priority is claimed to German Patent Application DE 10 2015 104 712.8, filed Mar. 27, 2015, the disclosure of which is incorporated by reference herein in its entirety as if set forth at length.

BACKGROUND OF THE INVENTION

The invention relates to a device for carrying out a linear displacement of two shafts positioned parallel to each other, each of which is at least indirectly connected to a main cogwheel, wherein the two main cogwheels are mounted for reciprocatory displacement along a straight guide rail.

Devices of the kind described above are known in the art in a number of different forms. All of the prior devices, however, exhibit the drawback that phase locking between the two main cogwheels is lost when the two main cogwheels move away from each other when there is a lateral displacement of a second main cogwheel with respect to a first main cogwheel.

SUMMARY OF THE INVENTION

Thus it is an object of the present invention to provide a device in which the speeds of rotation of two shafts both coupled to a main cogwheel are in a fixed phase relationship to each other irrespective of adjustable variations in the distance of the shafts and main cogwheels relatively to each other when the two shafts and the associated main cogwheels run at the same velocity of rotation.

With respect to a device of the kind described above this object is achieved according to the invention in that the bearing forming the fulcrum of rotation of a first main cogwheel determining the velocity of rotation and the phase of rotation is in the form of a first vertex of a parallelogram construction as is formed by arms pivoted in the region of all vertices, while a driving cogwheel which is disposed at a third vertex opposite to the first vertex and is driven by an auxiliary cogwheel disposed at the second vertex of the parallelogram construction and which in turn drives a second main cogwheel at the same speed as, and in phase with, the first main cogwheel, the second main cogwheel being mounted for motion in the direction of the longitudinal axis of a basic arm, in which the bearing forming the fulcrum of rotation of the first main cogwheel and that of a further arm of the parallelogram construction are formed.

Preferred embodiments of the invention are the subject matter of the subclaims.

With the device of the invention, the combination of features to the effect that the bearing forming the fulcrum of rotation of a first main cogwheel and determining the velocity of rotation and the phase of rotation is in the form of a first vertex of a parallelogram construction as is formed by the arms pivoted in the region of all vertices, wherein a driving cogwheel is disposed at a third vertex opposite to the first vertex and is driven by an auxiliary cogwheel which is disposed at the second vertex of the parallelogram construction and which in turn drives a second main cogwheel at the same speed as, and in phase with, the first main cogwheel, wherein the second main cogwheel is mounted for motion in the direction of the longitudinal axis of a basic arm, in which the bearing forming the fulcrum of rotation of the first main cogwheel and that of a further arm of the parallelogram construction are formed, there is achieved a fixed locked phase relationship between the two main cogwheels and the shafts attached thereto independently of adjustable continuous variation of the distance between the two main cogwheels or between the shafts connected thereto.

The first main cogwheel is thus mounted in a fixed basic arm, whose longitudinal axis determines a direction of motion, along which the second main cogwheel can be moved.

The auxiliary cogwheel disposed between the first main cogwheel and the driving cogwheel serves to produce the same direction of rotation of the driving cogwheel and the first main cogwheel in order to drive the second main cogwheel in the opposite direction to the direction of rotation of the first main cogwheel. The arrangement of the plurality of each of the rigid arms thereby causes the driving cogwheel to rotate in preset phase locking with the first main cogwheel. The second main cogwheel is then driven via the driving cogwheel showing appropriate phase feedback with the first main cogwheel.

Using the device of the invention, it is possible to drive shafts or rollers of which the speeds of rotation are in a fixed phase relationship to each other irrespective of any adjustments to the distance between the associated shafts or rollers while rotating at constant speed.

According to a first preferred embodiment of the device of the invention, provision is made for the first main cogwheel, mounted for rotation on a stationary main arm, to be connected to a first end of a first supporting arm via a first main rotary bearing enclosing the rotary shaft of the first main cogwheel, in the region of the other end of which, remote from the first main cogwheel, the auxiliary cogwheel meshing with the first main cogwheel is mounted for rotation and meshes with the driving cogwheel adapted to drive the second main cogwheel, the bearings forming the fulcrum of rotation of the driving cogwheel and that of the auxiliary cogwheel being interconnected via a carrier arm.

According to another preferred embodiment of the device of the invention, a first end of the second supporting arm is mounted for rotation in the region of one end of the main arm that is near to the second main cogwheel, while the driving cogwheel meshing with the auxiliary cogwheel is mounted for rotation in the region of the other end of the main arm.

The first and second supporting arms together with the main arm and the carrier arm thus form a preferably reversibly compressible/expandable parallelogram construction.

According to a further preferred embodiment of the device of the invention, the auxiliary cogwheel and the driving cogwheel are disposed in the region of respective ends of the carrier arm, wherein the driving cogwheel is likewise mounted for rotation in the region of a first end of a third supporting arm, in the region of the other end of which the second main cogwheel is mounted for rotation.

The second main cogwheel meshing with the driving cogwheel is connected to the third supporting arm in the region of the other end of the third supporting arm preferably via a second main rotary bearing enclosing a rotary shaft of the second main cogwheel.

According to another important and preferred embodiment of the device of the invention, the main cogwheels, on the one hand, and the auxiliary cogwheel and the driving cogwheel, on the other hand, are in each case of the same diameter, while the diameter of the auxiliary cogwheel and that of the driving cogwheel can be of a smaller dimension than the diameter of the two main cogwheels.

According to the above stipulations, the first and second supporting arms are of the same length and are positioned parallel to each other, while the main arm and the carrier arm are likewise of equal length and are positioned parallel to each other.

In accordance with the above stipulations, the second and third supporting arms are equal in length and are oriented so as to assume the same angle relatively to the carrier arm, but at an angle that is always mirrored in an axis running at 90° to the carrier arm, since the second main cogwheel is mounted for moving reciprocatorily (that is to say, is capable of moving bidirectionally) along a linear guide rail that is oriented in a prolongation of the longitudinal axis of the fixed main arm.

Alternatively, provision can be made for each of the second and third supporting arms to be of the same length and to form two adjacent arms of a second parallelogram construction.

The two main cogwheels preferably drive shafts that are directly or indirectly connected to roller conveyors, of which the speed of rotation is related to each other in a fixed phase relationship irrespective of adjustments made to the distance between the roller conveyors while running at the same velocity of rotation.

BRIEF DESCRIPTION OF THE DRAWINGS

The device of the invention is explained below with reference to a preferred embodiment which is illustrated in the Figures of the drawings, in which.

DETAILED DESCRIPTION

Figure 1:
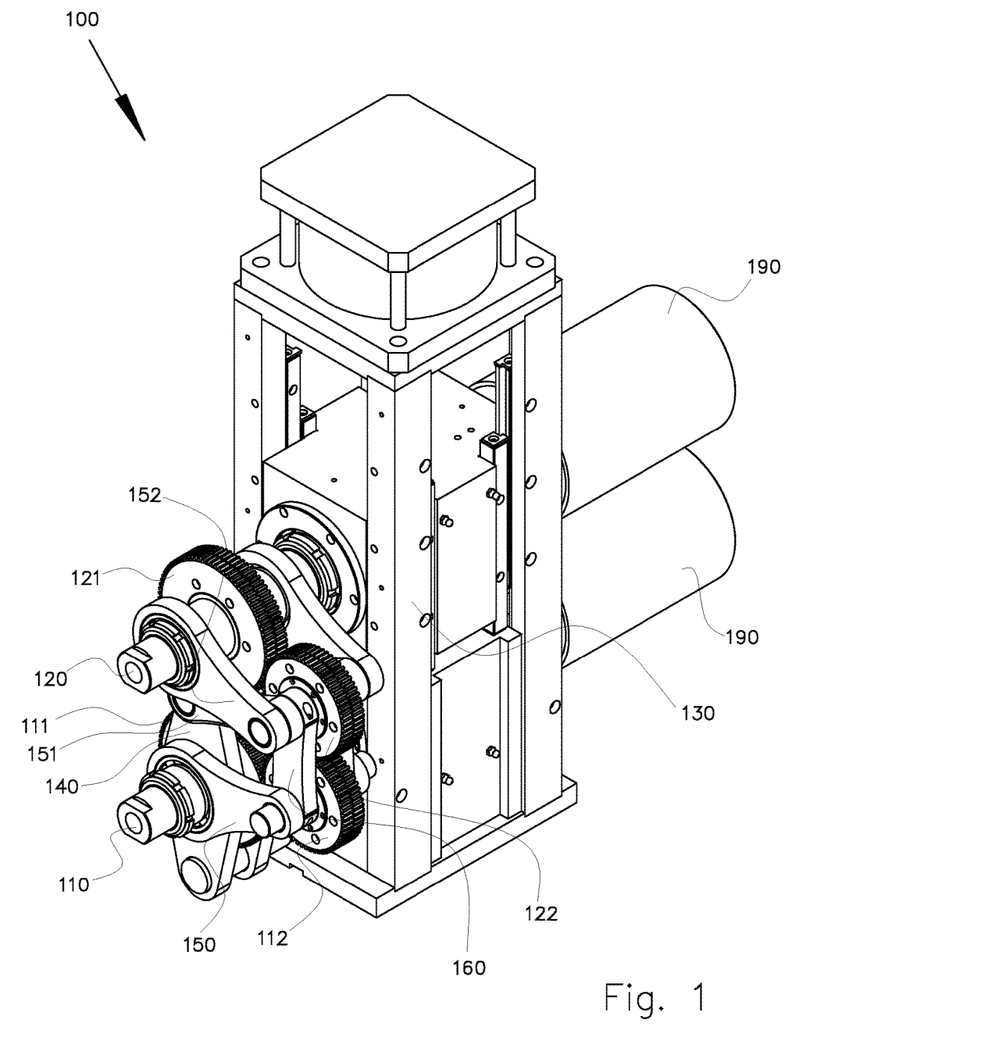
FIG. 1 shows a preferred embodiment of the device of the invention, as seen obliquely from above.
Figure 2:
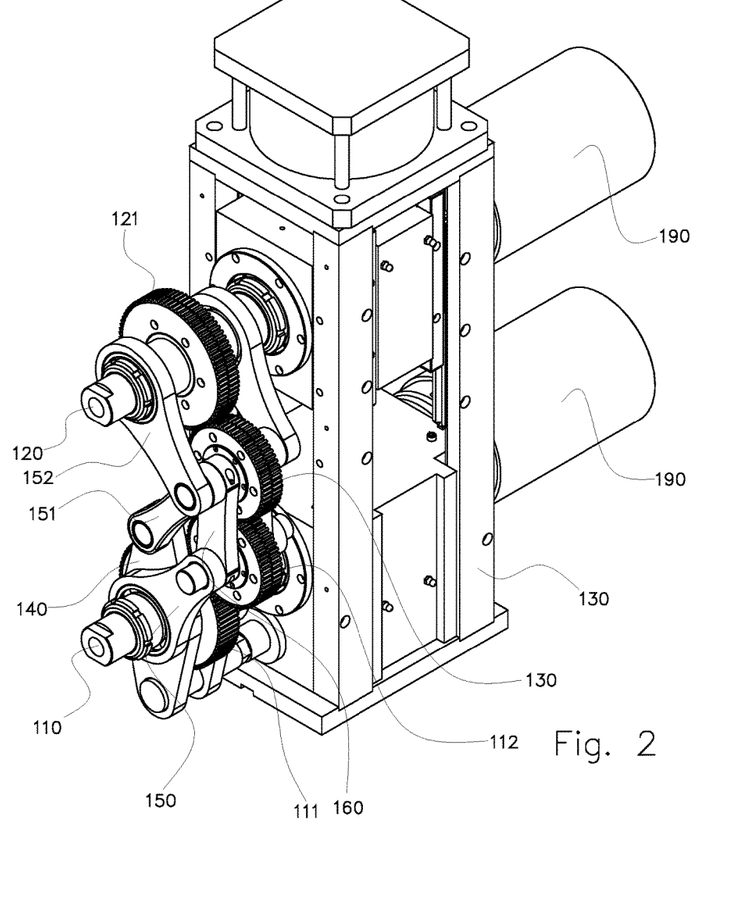
FIG. 2 shows the preferred embodiment the device of the invention shown in FIG. 1, again as seen obliquely from above.
Figure 3:
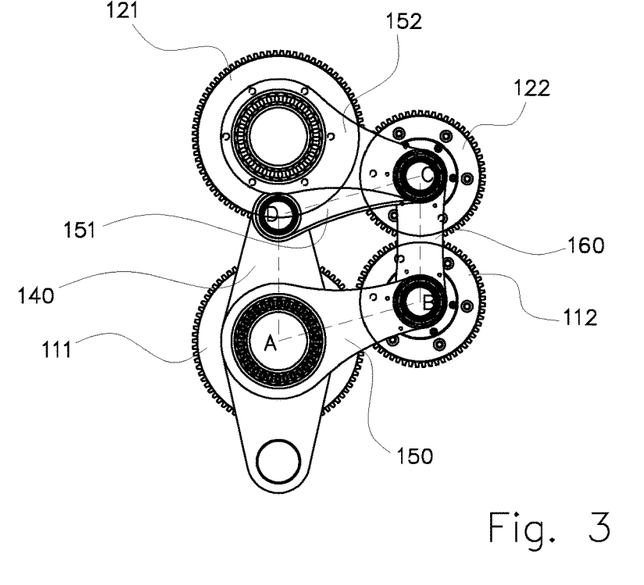
FIG. 3 shows the preferred embodiment of the device of the invention shown in FIG. 1, in a first side view.
Figure 4:
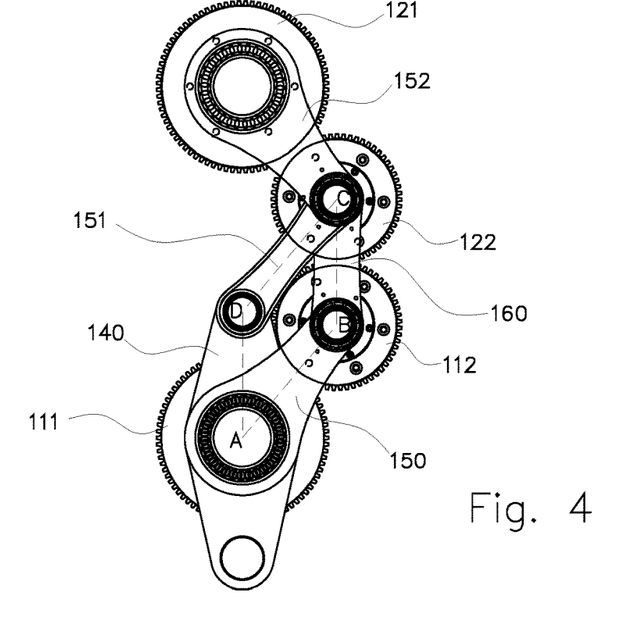
FIG. 4 shows the preferred embodiment of the device of the invention shown in FIG. 1, in a second side view.
Figure 5:
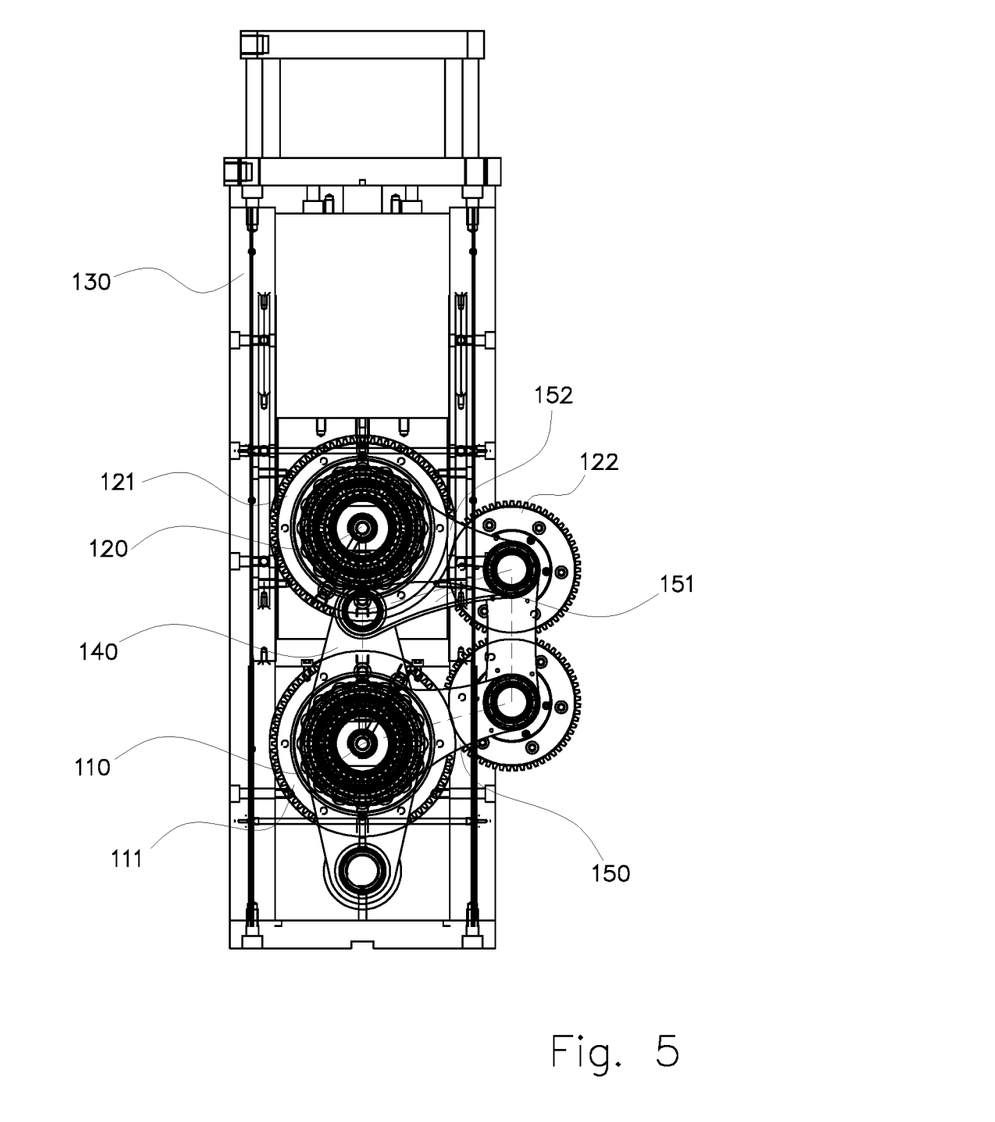
FIG. 5 shows the preferred embodiment of the device of the invention shown in FIG. 1, in a third side view.
Figure 6:
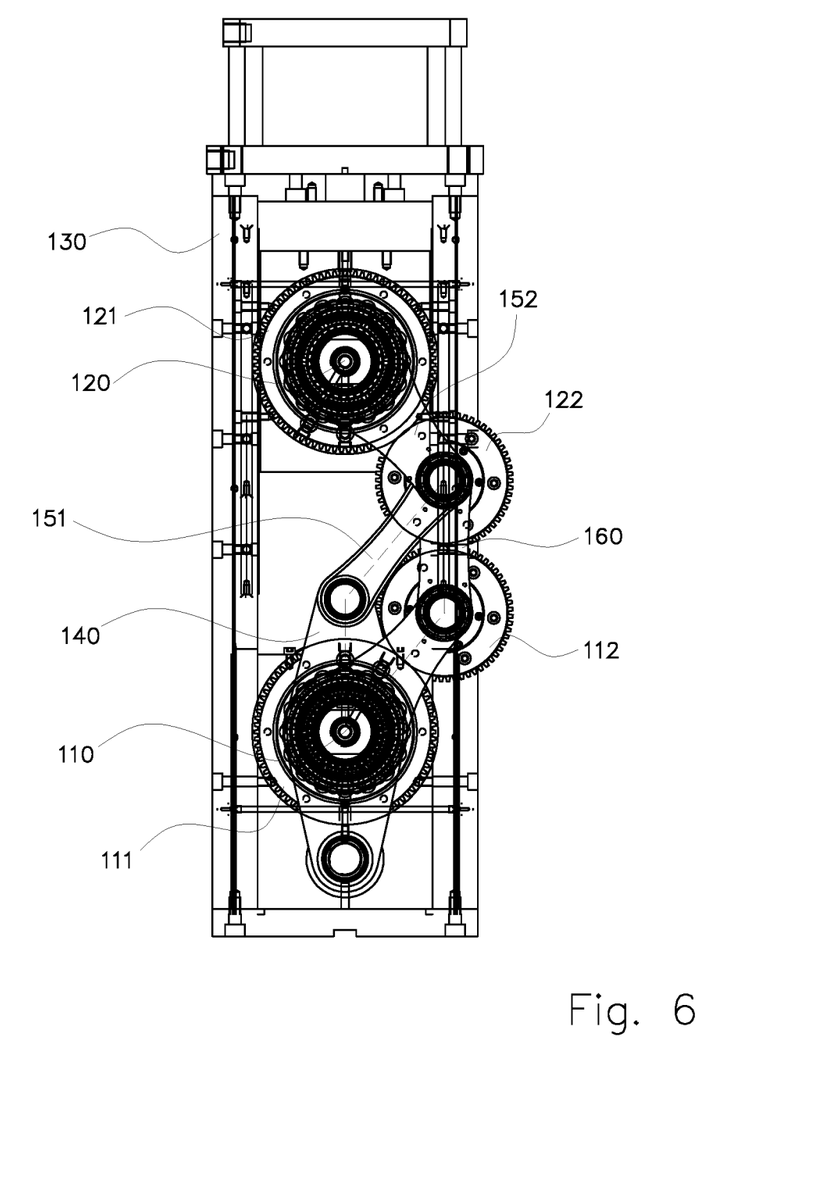
FIG. 6 shows the preferred embodiment of the device of the invention shown in FIG. 1, in a fourth side view.

The device 100 of the invention, as shown in FIGS. 1 to 6, for carrying out a linear displacement comprises two shafts 110, 120, which are positioned parallel to each other, each being directly connected to a main cogwheel 111, 121, which main cogwheels 111, 121 are mounted for reciprocatory displacement along a straight guide rail 130.

A first main cogwheel 111 mounted for rotation on a stationary main arm 140 is connected, via a first main rotary bearing enclosing the rotary shaft 110 of the first main cogwheel 111, to a first end of a first supporting arm 150, in the region of the other end of which, remote from the first main cogwheel 111, an auxiliary cogwheel 112 meshing with the first main cogwheel 111 is mounted for rotation, which auxiliary cogwheel 112 meshes with a driving cogwheel 122 adapted to drive the second main cogwheel 121, the auxiliary cogwheel 112 and the driving cogwheel 122, on the one hand, and the two main cogwheels 111, 121, on the other hand, being mounted for rotation in the region of the respective ends of the pivoted arms 151, 152.

In the region of one end of the main arm 140 near to the second main cogwheel 121, there is pivoted a first end of a second supporting arm 151, in the region of the other end of which the driving cogwheel 122 meshing with the auxiliary cogwheel 112 is mounted for rotation.

The auxiliary cogwheel 112 and the driving cogwheel 122 are disposed in the region of respective ends of a carrier arm 160, the driving cogwheel 122 being likewise mounted for rotation in the region of a first end of a third supporting arm 152.

The second main cogwheel 121 meshing with the driving cogwheel 122 is connected, in the region of the other end of the third supporting arm 152, to the third supporting arm 152 via a second main rotary bearing enclosing a rotary shaft 120 of the second main cogwheel 121.

The main cogwheels 111, 121, on the one hand, and the auxiliary cogwheel 112 and the driving cogwheel 122, on the other hand, are respectively equal in diameter, the diameter of the auxiliary cogwheel 112 and driving cogwheel 122 being smaller than the diameter of the two main cogwheels 111, 121.

The first supporting arm 150 and the second supporting arm 151 are each of the same length, while the first supporting arm 150 and the second supporting arm 151, on the one hand, are positioned parallel to each other and the main arm 140 and the carrier arm 160, on the other hand, are of the same length and are positioned parallel to each other.

The first supporting arm 150 and the second supporting arm 151 and also the main arm 140 and the carrier arm 160 form a reversibly compressible/expandable parallelogram construction (A, B, C, D). The second main cogwheel (121) is thereby mounted for reciprocatory displacement along a linear guide rail (130), which is oriented in a prolongation of the longitudinal axis of the fixed main arm (140), in which the bearing forming the fulcrum of rotation of the first main cogwheel and that of the second supporting arm are disposed.

The second supporting arm 151 and the third supporting arm 152 are likewise each of the same length and are oriented, by reason of their capability of moving along the guide rail 130, so as to assume a similarly dimensioned angle relatively to the carrier arm 160 but at an angle that is always mirrored in an axis 180 running at 90° to the carrier arm 160.

The system shown demonstrates that the bearing forming the fulcrum of rotation of the first main cogwheel 111 determining the velocity of rotation and the phase of rotation is formed as a first vertex A of a parallelogram construction (A, B, C, D), as formed by each of the arms 150, 160, 151, 140 mounted for rotation in the region of each of the vertices (A, B, C, D), while a driving cogwheel 122 is disposed on a third vertex C disposed opposite to the first vertex A, which driving cogwheel 122 is driven via an auxiliary cogwheel 112 disposed on a second vertex B of the parallelogram construction (A, B, C, D) and in turn drives a second main cogwheel 121 at the same speed as, and in phase with, the first main cogwheel 111.

The two main cogwheels 111, 121 drive shafts 110, 120, which are connected to roller conveyors 190, whose speeds of rotation bear a fixed phase relationship to each other irrespective of any adjustments to the distance of the roller conveyors 190 from each other while rotating at the same speed.

The exemplary embodiment of the invention described above merely serves the purpose of providing a better understanding of the teaching of the invention defined in the claims, which teaching is not, as such, restricted to the exemplary embodiment.

I claim:

1. A device 100 for carrying out a linear displacement of two parallel shafts (110, 120) that are individually at least indirectly connected to a main cogwheel (111, 121), wherein the two main cogwheels (111, 121) are mounted for reciprocatory displacement along a straight guide rail (130), characterized in that:
    a bearing forming the fulcrum of rotation of the first main cogwheel (111) determining the velocity of rotation and the phase of rotation is in the form of a first vertex (A) of a parallelogram construction (A, B, C, D), as formed by each of the arms (150, 160, 151, 140) pivoted in the region of each of the vertices (A, B, C, D);
    a driving cogwheel (122) is disposed on a third vertex (C) disposed opposite to the first vertex (A);
    the driving cogwheel (122) is driven via an auxiliary cogwheel (112) which is disposed at a second vertex (B) of the parallelogram construction (A, B, C, D) and which in turn drives a second main cogwheel (121) at the same speed as, and in phase with, the first main cogwheel (111);
    the second main cogwheel (121) is mounted for movement in the direction of the longitudinal axis of a basic arm, in which the bearing forming the fulcrum of rotation of the first main cogwheel (111) and that of a further arm of the parallelogram construction (A, B, C, D) are formed;
    the first main cogwheel (111) mounted for rotation on a stationary main arm (140) is connected, via a first main rotary bearing enclosing a rotary shaft (110), to a first end of a first supporting arm (150), in the region of the other end of which, remote from the first main cogwheel (111), the auxiliary cogwheel (112) meshing with the first main cogwheel (111) is mounted for rotation and meshes with the driving cogwheel (122) driving the second main cogwheel (121); and
    the bearing forming the fulcrum of rotation of the driving cogwheel (122) and that of the auxiliary cogwheel (112) are interconnected via a carrier arm (160).

2. A device (100) as claimed in claim 1 characterized in that:
    in the region of that end of the main arm (140) that is near to the second main cogwheel (121) a first end of the second supporting arm (151) is pivoted and in the region of the other end of which the auxiliary cogwheel (112) meshing with the driving cogwheel (122) is mounted for rotation.

3. A device (100) as claimed in claim 1 characterized in that:
    the auxiliary cogwheel (112) and the driving cogwheel (122) are disposed in the region of the respective ends of the carrier arm (160); and
    the driving cogwheel (122) is likewise mounted for rotation in the region of a first end of a third supporting arm (152), in the region of the other end of which the second main cogwheel (121) is mounted for rotation.

4. A device (100) as claimed in claim 3, characterized in that:
    the second main cogwheel (121) meshing with the driving cogwheel (122) is connected to the third supporting arm (152), in the region of the other end of the third supporting arm (152), via a second main rotary bearing enclosing the rotary shaft (120) of the second main cogwheel (121).

5. A device (100) as claimed in claim 4, characterized in that:
    the main cogwheels (111, 121), on the one hand, and the auxiliary cogwheel (112) and the driving cogwheel (122), on the other hand, are respectively of the same diameter.

6. A device (100) as claimed in claim 5, characterized in that:
    the diameter of the auxiliary cogwheel (112) and driving cogwheel (122) is smaller than the diameter of the two main cogwheels (111, 121).

7. A device (100) as claimed in claim 6, characterized in that:
    the first supporting arm (150) and the second supporting arm (151) are in each case of the same length and are positioned parallel to each other; and
    the main arm (140) and the carrier arm (160) are likewise of the same length and are positioned parallel to each other.

8. A device (100) as claimed in claim 7, characterized in that:
    the first supporting arm (150) and the second supporting arm (151) and the main arm (140) and the carrier arm (160) together form a reversibly compressible/expandable parallelogram construction.

9. A device (100) as claimed in claim 8, characterized in that:
    the second main cogwheel (121) is mounted for reciprocatory displacement along a linear guide rail (130), which is oriented in a prolongation of the longitudinal axis of the main arm (140).

10. A device (100) as claimed in claim 9, characterized in that:
    the second supporting arm (151) and the third supporting arm (152) are each of the same length and are oriented so as to assume the same angle relatively to the carrier arm (160), but at an angle that is always mirrored in an axis running at 90° to the carrier arm (160).

11. A device 100 as claimed in claim 8, characterized in that:
    the second supporting arm (151) and the third supporting arm (152) are each of the same length and form two adjacent arms of a second parallelogram construction.

12. A device (100) as claimed in claim 11, characterized in that:
    the two main cogwheels (111, 121) drive shafts (110, 120) that are connected to roller conveyors (190), whose speeds of rotation are related to each other in a fixed phase relationship irrespective of any adjustments made for changing the distance between the roller conveyors (190).

13. A device (100) as claimed in claim 1, characterized in that:
    the two main cogwheels (111, 121) drive shafts (110, 120) that are connected to roller conveyors (190), whose speeds of rotation are related to each other in a fixed phase relationship irrespective of any adjustments made for changing the distance between the roller conveyors (190).

14. A device 100 for carrying out a linear displacement of two parallel shafts (110, 120) that are individually at least indirectly connected to a main cogwheel (111, 121), wherein the two main cogwheels (111, 121) are mounted for reciprocatory displacement along a straight guide rail (130), characterized in that:
    a bearing forming the fulcrum of rotation of the first main cogwheel (111) determining the velocity of rotation and the phase of rotation is in the form of a first vertex (A) of a parallelogram construction (A, B, C, D), as formed by each of the arms (150, 160, 151, 140) pivoted in the region of each of the vertices (A, B, C, D);

a driving cogwheel (122) is disposed on a third vertex (C) disposed opposite to the first vertex (A);

the driving cogwheel (122) is driven via an auxiliary cogwheel (112) which is disposed at a second vertex (B) of the parallelogram construction (A, B, C, D) and which in turn drives a second main cogwheel (121) at the same speed as, and in phase with, the first main cogwheel (111);

the second main cogwheel (121) is mounted for movement in the direction of the longitudinal axis of a basic arm, in which the bearing forming the fulcrum of rotation of the first main cogwheel (111) and that of a further arm of the parallelogram construction (A, B, C, D) are formed; and the two main cogwheels (111, 121) drive shafts (110, 120) that are connected to roller conveyors (190), whose speeds of rotation are related to each other in a fixed phase relationship irrespective of any adjustments made for changing the distance between the roller conveyors (190).

\* \* \* \* \*